Aug. 22, 1961     D. R. KIRK ET AL     2,997,262
AIRCRAFT WING STRUCTURE
Filed Jan. 21, 1960     2 Sheets-Sheet 1
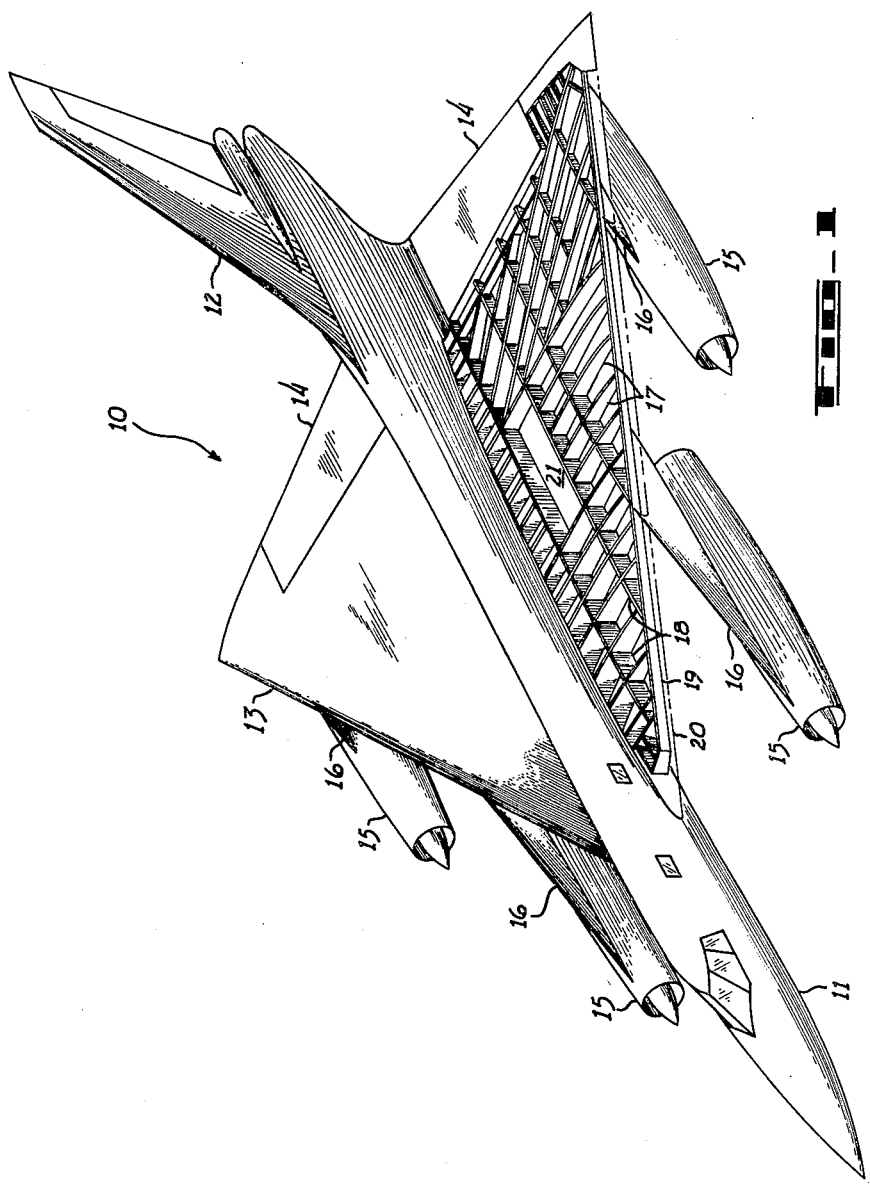
INVENTORS
DONALD R. KIRK
DOWELL V. ALLEN
BY Walter J. Jason
ATTORNEY
Bernard V. Ousley
AGENT Aug. 22, 1961 D. R. KIRK ET AL 2,997,262
AIRCRAFT WING STRUCTURE
Filed Jan. 21, 1960 2 Sheets-Sheet 2
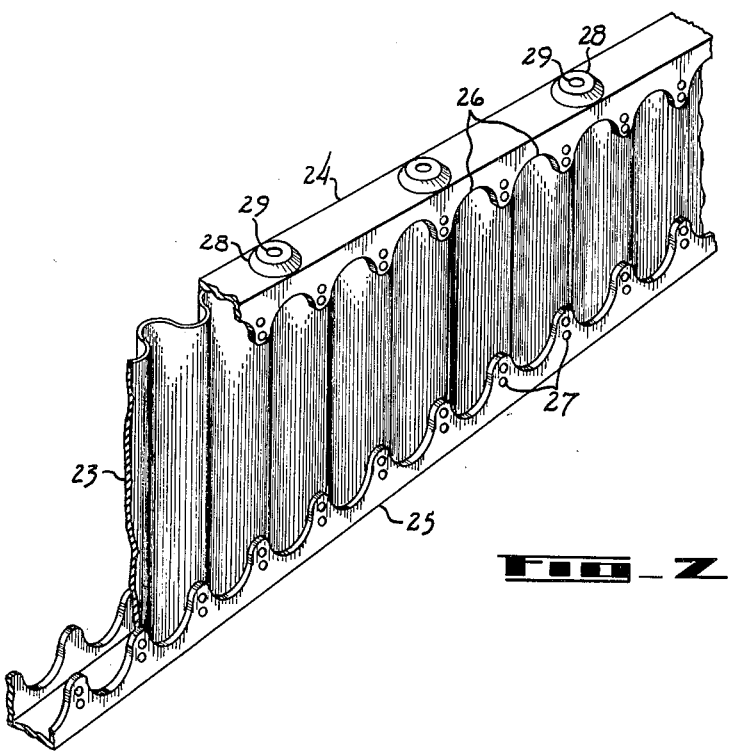
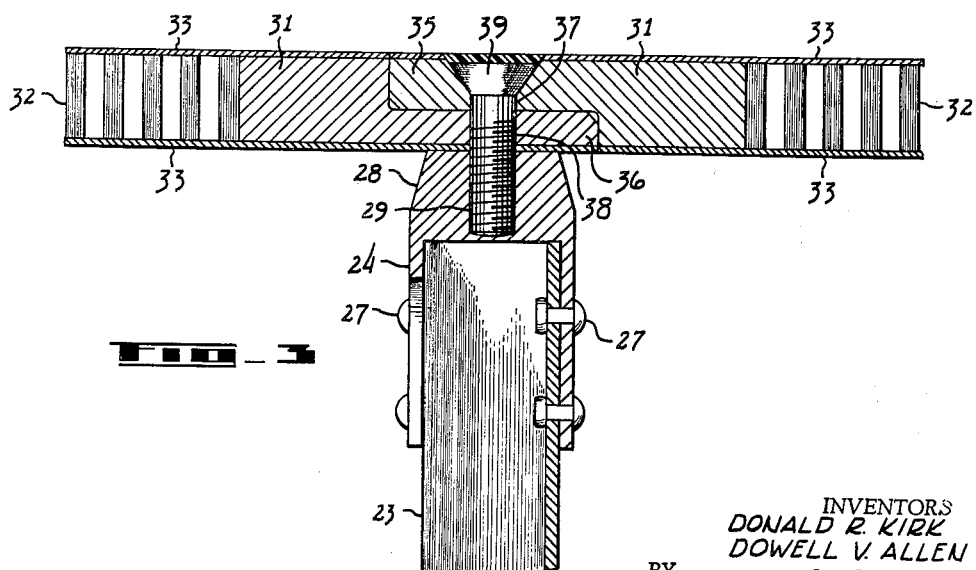
INVENTORS
DONALD R. KIRK
DOWELL V. ALLEN
BY Walter J. Jason
ATTORNEY
Bernard V. Ousley
AGENT United States Patent Office 2,997,262
Patented Aug. 22, 1961

2,997,262
AIRCRAFT WING STRUCTURE
Donald R. Kirk and Dowell V. Allen, Fort Worth, Tex., assignors to General Dynamics Corporation (Convair Division), San Diego, Calif., a corporation of Delaware
Filed Jan. 21, 1960, Ser. No. 3,888
7 Claims. (Cl. 244—123)

The present invention relates generally to stress-carrying structures; and more particularly, to an improved construction adapted to form an aircraft wing structure.

In present day high speed aircraft it is necessary to have an airframe which can withstand severe aerodynamic and thermal stresses. One of the structural components which comprise the airframe, the wing is that component normally subjected to the most severe stresses. In addition to being able to withstand these stresses however, the wing must also act as the fuel tank and incorporate adequate insulation and sealing provisions to prevent fuel loss due to boiling and leakage.

Heretofore, wing structures have generally consisted of an external skin of moderately heavy gage sheet metal riveted over an internal framework of numerous closely spaced spars, bulkheads, stiffeners, angles, clips, etc. A separate fuel tank of sheet metal or rubber was usually positioned within the internal framework to serve as a fuel storage reservoir.

A number of disadvantages, however, are inherent in this type of wing construction. One disadvantage is that the primary function of the skin is merely to provide an aerodynamically smooth covering for the wing and does not serve, to any substantial degree, as a prime load carrying component. Another disadvantage is that the strength-to-weight ratio, which is of utmost importance, is comparatively low. In addition, the complexity of this type wing structure makes the assembly and installation thereof unduly difficult. And still further, this type of wing construction does not provide satisfactory insulation for shielding the fuel from the effects of the high temperatures generated in high speed flight.

The present invention is characterized as a wing structure having structural members, such as spars and bulkheads, to which are attached a plurality of bonded or brazed cellular-cored, composite structural panels which serve to form the aerodynamic surface of the wing.

Numerous advantages result from the use of the present wing structure. The composite panels serve not only to provide a smooth aerodynamic surface, but also serve as structural components which carry a substantial part of the loads imposed on the wing. This makes it possible to use fewer, more widely spaced spars, and bulkheads, which in turn results in an overall weight saving and a much higher strength-to-weight ratio than with prior wing structures. The attach points of the panels are readily sealable so that an integral fuel tank is formed thereby, thus eliminating the need for a separate fuel container. A cellular or honeycomb lattice is generally used as the panel core materials, which provides excellent heat insulation for the fuel. Further advantages of the instant structure are the simplicity of design and the ease of assembly, since a minimum number of detail parts are used in the construction thereof.

It is therefore an object of the present invention to provide a wing structure which is particularly adapted for use on high speed aircraft.

Another object of the invention is to provide a wing structure which has an exceptionally high strength-to-weight ratio.

Another object is to provide an aircraft wing structure which has good heat insulation characteristics.

Another object is to provide an aircraft wing structure of simple design, the component parts of which are easily assembled.

And still other objects and features of the present invention will be readily apparent to those skilled in the art from the following specification and appended drawings wherein is illustrated a preferred form of the invention, and in which:

FIGURE 1 shows a typical embodiment of the invention as employed on a present day, high speed aircraft;

FIGURE 2 illustrates the typical construction of the spars and bulkheads employed in the wing; and FIG. 3 is a sectional view through a typical position at which the composite panels are attached to the wing internal structure.

Referring now to FIGURE 1 of the drawings, an aircraft 10 embodying the present invention is shown as generally comprising a fuselage 11, a vertical fin or tail 12, a triangularly shaped or delta wing 13 having control surfaces 14 along the trailing edge thereof and turbojet engines 15 suspended below the wing by means of pylons 16.

In order to reveal the internal structure of the wing, the composite skin panels are omitted from one half thereof. The internal structure so revealed consists basically of a framework of lateral spar members 17 and longitudinal bulkhead members 18. A leading edge spar member 19 extends the length of the wing leading edge, and the leading edge fairing, indicated by the broken line at 20, is attached thereto. In the forward portion of the wing the spars and bulkheads are disposed substantially at right angles to each other, thus forming a plurality of very rigid "box" sections. In the aft section of the wing, however, because of the location of the control surfaces, it is generally advantageous to cant the spars rearwardly in order to extend them outwardly toward the extreme wing tip. A wheel well 21 is provided in the approximate center of each wing-half to accommodate the main landing gear in its retracted position.

A major portion of the spars, both the lateral and canted types, as well as a part of the bulkhead members, are of a construction shown in FIGURE 2. Such construction consists of a corrugated web 23 disposed between upper and lower cap members 24 and 25, respectively. The cap members have a channel shaped cross-section so as to fit over the web. The sides of the cap members are scalloped as at 26 to save weight, the scallops being the same distance apart are are the corrugations of the web. The scallops on opposite sides of the cap members are offset one half the distance between scallops so that each scallop on either side corresponds to the outermost point on a web corrugation. Rivets 27, or other suitable fastening methods or devices, are employed to fasten the cap members to the web. Upon the upper and lower surfaces of cap members 24 and 25, respectively, are formed a plurality of boss protrusions 28, each of which is drilled and tapped in the center thereof at 29 for a purpose to be explained hereinafter. The construction of the structural member described above is especially rigid and strong, particularly under vertical bending loads. The corrugated webs employed in the construction are generally relatively thin, and result in a very light weight structure.

The wing structure may be so designed that the forward lateral spars extend unbroken across the wing from one leading edge to the other. In such a design the web may be formed with flattened areas at desired locations therealong to provide for the attachment of the bulkheads thereto.

The spars and bulkhead which are not of the above described corrugated configuration are generally of a conventional machined construction having a flat web with upper and lower lateral flanges. Such machined spars and bulkheads are employed primarily at locations where it is necessary to attach accessory equipment thereto, such as about the wheel well and immediately forward of the control surfaces. In general it is also desirable to employ a machined structure in the leading edge spar to facilitate the attachment of the leading edge fairing thereto.

Referring now to FIGURE 3, a composite structural wing panel, which is the subject of a co-pending application, Serial Number 755,505 entitled Composite Structural Panel, by Donald R. Kirk and Larz M. Smith, typically consists of a frame 31 having openings therethrough wherein are disposed sections of cellular core material 32, such as fiberglass or aluminum foil, to either side of which is bonded or brazed a sheet metal skin 33, so as to form a very lightweight and strong structural component.

The peripheral member of the frame is provided with an outwardly extending flange, adjacent panels having opposite flanges as at 35 and 36, so as to overlap each other and form a joint. The panels are so sized and shaped that such a joint is formed at a spar or bulkhead. Holes 37 and 38 are pre-drilled in flanges 35 and 36, respectively, and hole 37 is countersunk to receive a high strength socket head bolt 39 which extends through both flanges 35 and 36 and into the tapped hole 29 in boss 28 of cap member 24. After the bolt has been tightened sufficiently the portion of the hole 37 above the bolt head is filled with a high temperature sealant compound, such as Thiokol rubber, which serves not only to seal the hole, but also serves to restore the smoothness of the aerodynamic surface of the wing. In some instances it may also be found desirable to coat the flanges of the panels and the bolt with sealant prior to assembly in order to obtain a more reliable seal at the attachment points.

By using high strength bolts it is possible to use fewer fasteners than previously employed in aircraft wings. Furthermore, the use of bolts permits easy removal of the panels in the event that it is necessary to gain access to the interior of the wing.

Thus it is seen that the present invention, through its particular structural features, achieves many advantages over previous types of wing construction. But it is to be remembered that although only the preferred embodiment of the invention has been herein specifically shown and described, it is not to be construed that the invention is limited thereto, as numerous variations and modifications will be apparent to those skilled in the art, and the invention is to be given the broadest possible interpretation within the spirit and scope of the following claims.

We claim:
1. In combination, a plurality of cellular-cored composite structural panels, a structural member comprising a corrugated member having opposite longitudinal sides which sides are substantially perpendicular to the troughs and ridges of said corrugation, longitudinal cap members secured to each of said longitudinal sides, each cap member having a plurality of bosses arranged therealong, each boss having a threaded hole therein adapted to receive a bolt, said structural member positioned between at least two of said composite structural panels and substantially perpendicular to both so that the bosses of said cap members are adjacent thereto, and said structural member secured in position by bolts protruding from said composite structural panels into said threaded holes in said bosses of said cap members.

2. In combination with at least two composite structural panels positioned immediately side by side in a fluid tight joint, each panel comprising a relatively flat frame having openings through the flat depth thereof, each panel having cellular core sections disposed within said openings, each panel having relatively thin exterior sheet members secured to and covering opposite sides of said frame and core sections, one of said panels having an upper flange and the other of said panels having a lower flange such that the joint produced by their being positioned side by side is a lap joint as to said flanges and a butt joint as to said exterior sheet members, the lapped portion of said flanges having sealant material thereon, a structural member, said structural member comprising a corrugated member having at least one longitudinal side substantially perpendicular to the troughs and ridges of said corrugation, a cap member fixed to and covering said longitudinal side, said cap member having at least one boss containing a hole adapted to receive fastening means, said structural member positioned substantially perpendicularly to said panels and adjacent thereto with said longitudinal side positioned along the lap joint of said panel flanges, and fastening means disposed through the lapped joint and into said hole in said boss of said cap member to securely fasten said panels and structural member together.

3. In combination with at least two composite structural panels positioned immediately side by side in a fluid tight joint, each panel comprising a relatively flat frame having openings through the flat depth thereof, each panel having cellular core sections disposed within said openings, each panel having relatively thin exterior sheet members secured to and covering opposite sides of said frame and core sections, one of said panels having an upper flange and the other of said panels having a lower flange such that the joint produced by their being positioned side by side is a lap joint as to said flanges and a butt joint as to said exterior sheet members, a structural member, said structural member comprising a corrugated member having at least one longitudinal side substantially perpendicular to the troughs and ridges of said corrugation, a longitudinal cap member fixed to and covering said longitudinal side, said cap member having a plurality of bosses arranged therealong, each boss having a threaded hole therein adapted to receive a bolt, said structural member positioned substantially perpendicularly to said panels and adjacent thereto with said longitudinal cap member positioned along the lap joint of said panel flanges, and a plurality of bolts disposed through the lapped joint and into said holes in said bosses of said cap member to securely fasten said panels and structural member together.

4. A combination of members forming portions of an aircraft wing, the combination comprising a framework of spar and bulkhead structural members covered on top and bottom with a plurality of composite panels, said spar and bulkhead members each comprising a substantially longitudinal corrugated member having opposite longitudinal sides which sides are substantially perpendicular to the troughs and ridges of said corrugation, a longitudinal cap member secured to each of said longitudinal sides, each cap member having a plurality of bosses containing holes adapted to receive fastening means, and said composite panels secured to said spar and bulkhead cap members in a fluid tight covering thereover by fastening means extending from said panels into said holes in said boss of said cap members.

5. A combination of members forming portions of an aircraft wing, the combination comprising a framework of spar and bulkhead structural members covered on top and bottom with a plurality of cellular cored composite panels, said spar and bulkhead members each comprising a substantially longitudinal corrugated member having opposite longitudinal sides which sides are substantially perpendicular to the troughs and ridges of said corrugation, a longitudinal cap member fixed over each said longitudinal side, each cap member being a longitudinal channel having a bottom portion and opposite side flanges integral therewith, said bottom portion lying adjacent a longitudinal side of a corrugated member and said opposite side flanges disposed on opposite sides of said corrugated member, said side flanges secured to said corrugated member to secure said cap member in position over said longitudinal side, said bottom portion lying perpendicular to said longitudinal side and having a plurality of bosses provided with holes adapted to receive fastening means, and said composite panels secured to said spar and bulkhead cap members in a fluid tight covering thereover by fastening means extending from said panels into said holes in said bosses of said cap members.

6. A combination of members forming portions of an aircraft wing, the combination comprising a framework of spar and bulkhead structural members covered on top and bottom with a plurality of composite panels, said spar and bulkhead members each comprising a substantially longitudinal corrugated member having opposite longitudinal sides which sides are substantially perpendicular to the troughs and ridges of said corrugation, a longitudinal cap member secured to each of said longitudinal sides, each cap member having a plurality of bosses arranged therealong, each boss containing a hole adapted to receive fastening means, said composite panels covering said longitudinal sides of said spar and bulkhead members in a fluid tight cover but spaced apart therefrom by the bosses of said cap members covering said longitudinal sides, and said composite panels fixed to said spar and bulkhead members by fastening means extending from said panels into said holes in said cap members.

7. The combination of a plurality of structural members and composite structural panels, at least two of said panels having a side flange with sealant thereto, said flanged panels positioned immediately side by side with their side flanges forming a lap joint, the side flange on one panel being a lower flange than the side flange on the other panel, and the joint being a butt joint as to said panels so that one continuing panel plane appears at said joint, said lap joint of said flanges being fluid tight because of said sealant, at least one countersunk hole positioned at said joint through said lapped flanges, a bolt disposed therein with the head thereof set below the top of said countersunk hole, a sealant material filling in said countersunk hole above said bolt head; said structural members each comprising a corrugated member having opposite longitudinal sides which sides are substantially perpendicular to the troughs and ridges of said corrugation, cap members secured to each of said longitudinal sides, at least one of said cap members containing a boss having a threaded hole adapted to receive said bolt, and said bolt engaged in said hole to secure said side by side panels to said structural member.

References Cited in the file of this patent

UNITED STATES PATENTS

| | | |
|---|---|---|
| 854,391 | Voshardt | May 21, 1907 |
| 1,311,205 | Belcher | July 29, 1919 |
| 1,604,151 | Dornier | Oct. 26, 1926 |
| 1,835,524 | Rinehart et al. | Dec. 8, 1931 |
| 2,101,090 | Palmer | Dec. 7, 1937 |
| 2,749,061 | Franz | June 5, 1956 |
| 2,801,061 | Logan | July 30, 1957 |